Aug. 6, 1940.　　　E. F. RUCHE　　　2,210,779
STRIP PUNCHING AND VERIFYING DEVICE
Filed Oct. 26, 1938　　　5 Sheets-Sheet 1
Fig. 1
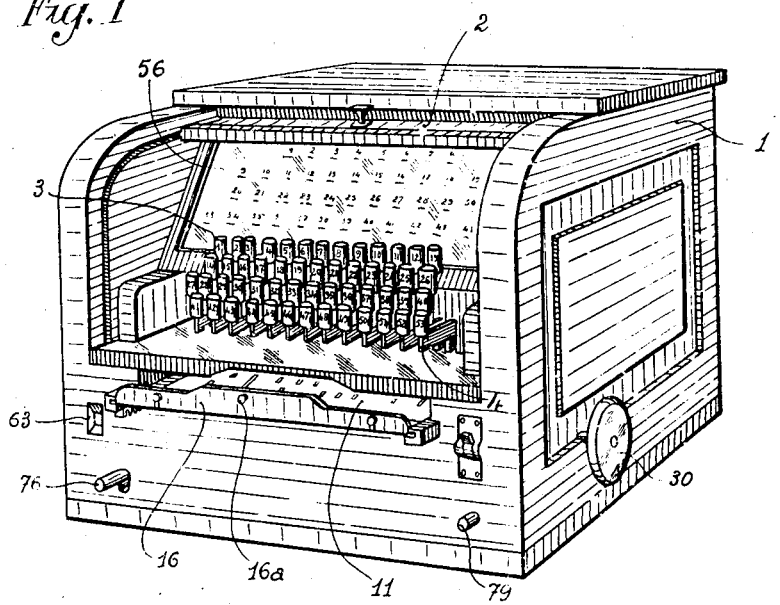
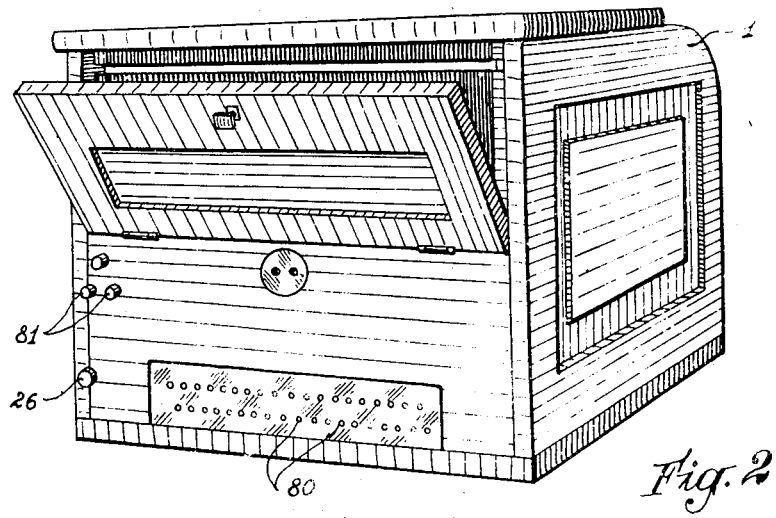
Fig. 2
INVENTOR:
Edouard Francis Ruche
By
ATTORNEYS Aug. 6, 1940.　　　　E. F. RUCHE　　　　2,210,779
STRIP PUNCHING AND VERIFYING DEVICE
Filed Oct. 26, 1938　　　5 Sheets-Sheet 3
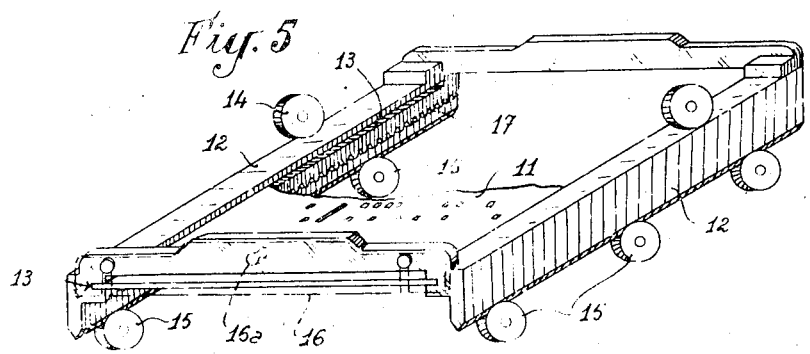
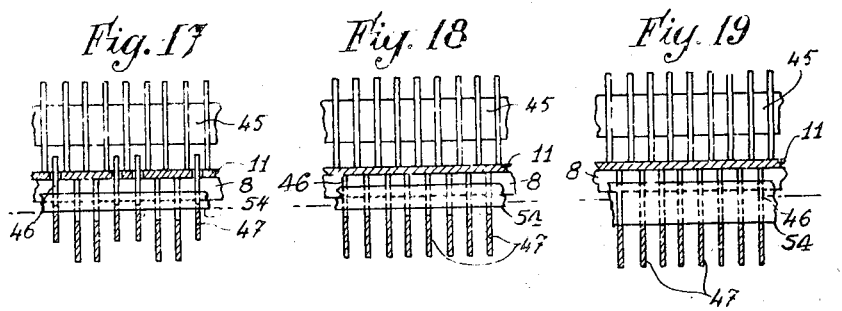
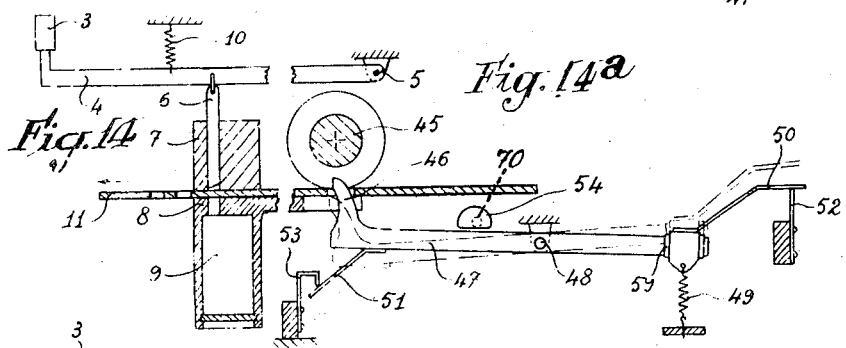
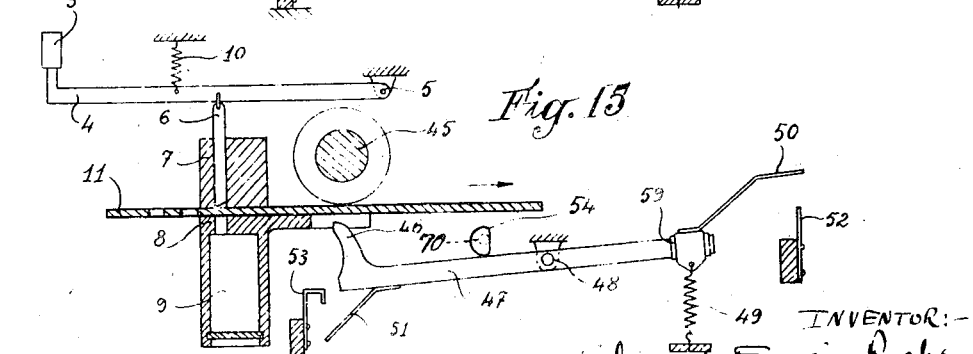

Aug. 6, 1940.  E. F. RUCHE  2,210,779
STRIP PUNCHING AND VERIFYING DEVICE
Filed Oct. 26, 1938  5 Sheets-Sheet 4
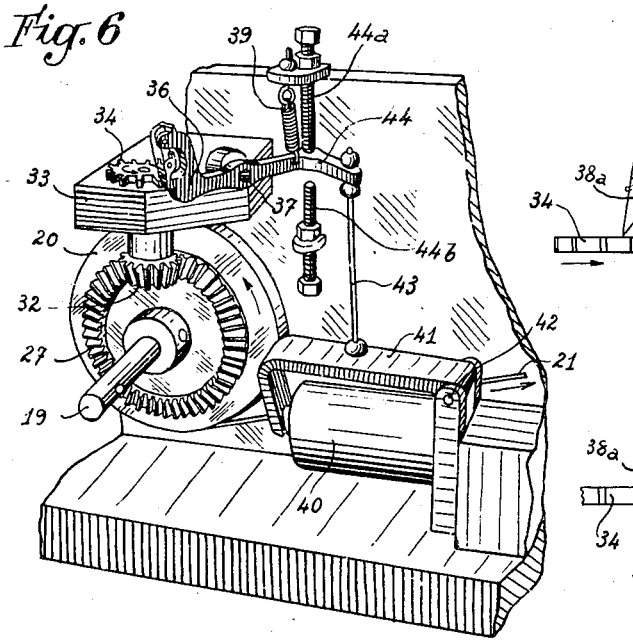
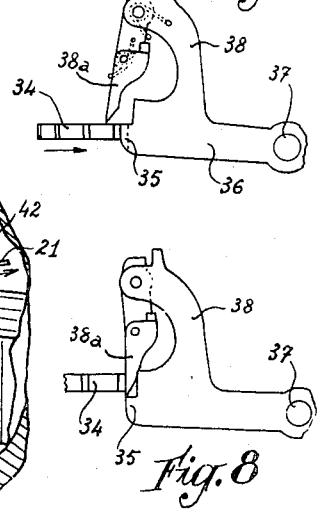
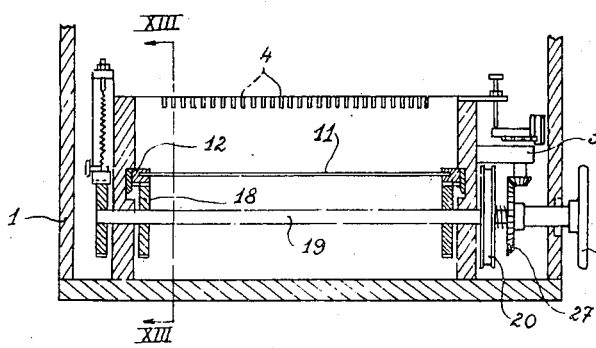
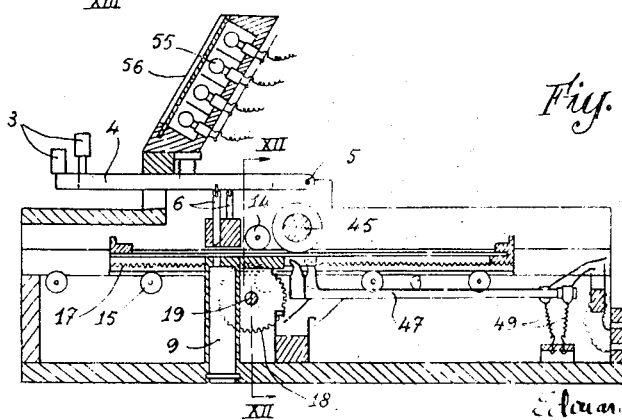

Aug. 6, 1940.    E. F. RUCHE    2,210,779
STRIP PUNCHING AND VERIFYING DEVICE
Filed Oct. 26, 1938    5 Sheets-Sheet 5
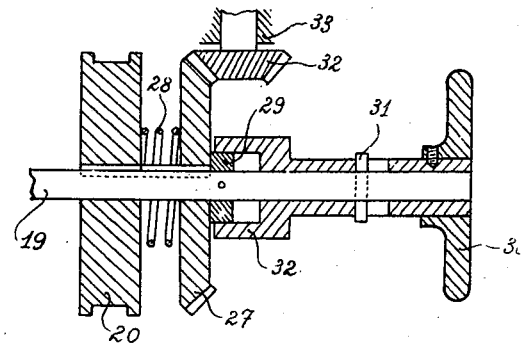
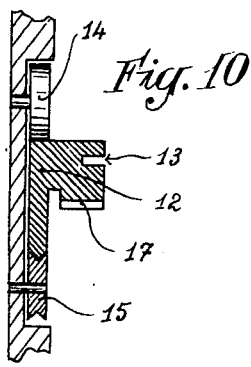
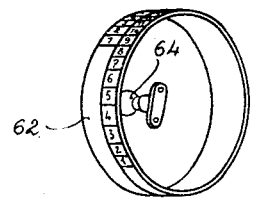
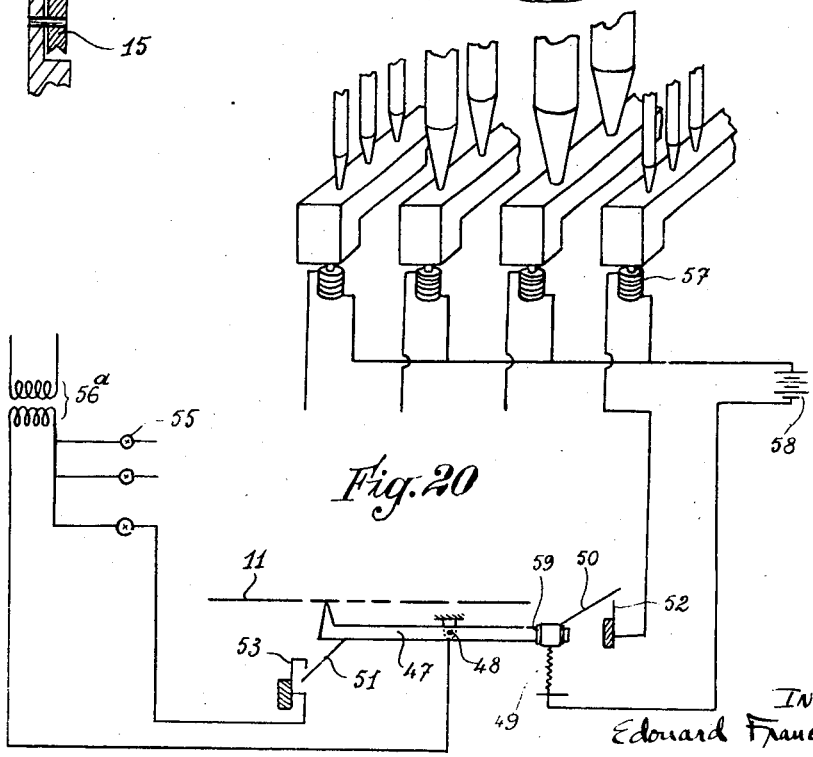
INVENTOR:-
Edouard Francis Ruche
By Alexander Dowell
ATTORNEYS Patented Aug. 6, 1940

2,210,779

UNITED STATES PATENT OFFICE 2,210,779

STRIP PUNCHING AND VERIFYING DEVICE

Edouard Francis Ruche, Lyon, France

Application October 26, 1938, Serial No. 237,088
In Germany August 13, 1937

1 Claim. (Cl. 164—112)

This invention relates to the perforation and verification of sheets of paper, cardboard or the like, more particularly for the automatic actuation of organ stops.

The object of this invention is to provide a machine by means of which the blank may be perforated and checked.

Still a further object of my invention is a machine comprising perforating punches operated by means of keys, electrical feelers actuated by the perforations and electric bulbs controlled by the said feelers.

In the annexed drawings:

Fig. 1 is a perspective view of a machine according to this invention.

Fig. 2 is a rear view thereof.

Fig. 5 shows the movable carriage with the perforated sheet.

Fig. 6 shows the escapement mechanism.

Figs. 7 and 8 diagrammatically illustrate the operation thereof.

Fig. 9 is a partial section showing the clutch on the carriage driving shaft.

Fig. 10 is a partial section illustrating the carriage guiding means.

Fig. 11 is a perspective view of the cylindrical feed dial.

Fig. 12 is a general cross-section taken on line XII—XII of Fig. 13.

Fig. 13 is a longitudinal section taken on line XIII—XIII of Fig. 12.

Figs. 14, 14a and 15 are enlarged partial longitudinal sections showing the parts corresponding to a punch and to a verifying feeler at two different positions.

Figure 16:
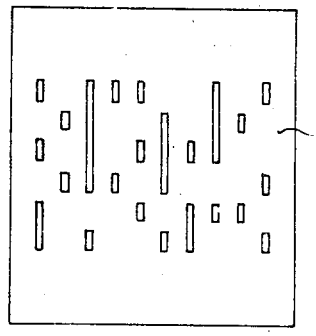

Fig. 16 illustrates a perforated sheet.

Figs. 17 to 19 are partial transverse sections showing different positions of the feeler fingers.

Fig. 20 is a general diagram of the electrical connections.

Figure 21:
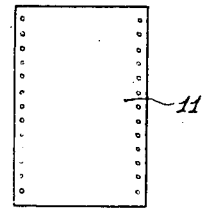

Fig. 21 diagrammatically indicates a modified form of perforated sheet.

The device illustrated comprises a casing 1, preferably made of wood, with a front curtain 2. A number of keys 3 (fifty-three in the example shown) are provided as shown, each being supported by a lever 4 (Figs. 13 to 15) pivoted at 5 and connected with a punch 6 slidable through a guide block 7 disposed above a die 8 provided with an internal space 9 to receive punchings. Springs 10 are provided for restoring levers 4.

The sheet 11 of cardboard or the like is carried by a movable rectangular carriage 12 (Fig. 5) the longitudinal sides of which are provided with opposed slits 13 for receiving the edges of the sheet. Carriage 12 is guided by fixed rollers 14 and 15 as shown in Fig. 10, rollers 15 having a V-shaped periphery which receives the lower edge of the longitudinal side of the carriage, the latter being thus movable longitudinally within casing 1, below keys 3. The front side of carriage 12 supports a retaining plate 16 (shown in full lines in Fig. 1 and in broken lines in Fig. 5) which may be raised when engaging the sheet into slits 13. Carriage 12 is so disposed that the sheet 11 passes between member 7 and die 8 (Figs. 14 and 15).

Figure 3:
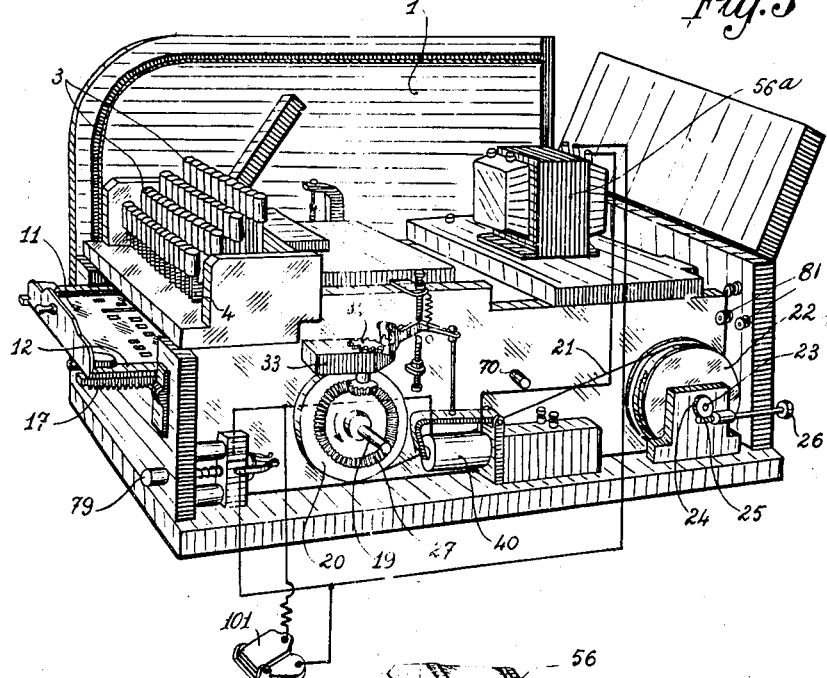
Fig. 3 is a side view, the casing being supposedly opened to show the feed mechanism.

Carriage 12 is provided with racks 17 (Fig. 10) in mesh with gear wheels 18 (Figs. 12 and 13) carried by a carriage driving shaft 19 which supports a drum 20; a cord, string, cable or like member 21 is wound on drum 20 (Fig. 3) while its other end is wound on a spring loaded drum 22, the shaft 23 of which is adjustable by a worm wheel 24 and worm screw 25 actuated by a button 26.

A bevel gear 27 (Fig. 9) is slidably keyed on shaft 19, the said gear being held by a spring 28 against a ring 29. Shaft 19 also carries a handwheel 30 keyed by means of a transverse cotter pin 31 but able to slide axially on shaft 19. The hub of handwheel 30 forms a cup 32 at its inner end, the said cup enclosing ring 29. It will be noted that handwheel 30 is supposedly removed in Figs. 3 and 6. Gear 27 meshes with a pinion 32, but it may be disengaged therefrom by pushing handwheel 30 against the action of spring 28 as it will be easily grasped from Fig. 9. The vertical shaft of pinion 32 is rotatably carried by a support 33 (Fig. 6) and its upper end is provided with a toothed wheel 34. The latter is normally held against rotation by a tooth 35 (Fig. 7) laterally provided on a lever 36 pivoted at 37. Lever 36 has an upward extension 38 on which there is articulated a spring loaded pawl 38a. At the raised position of lever 36 (Fig. 7), tooth 35 is engaged with wheel 34 while pawl 38a (which is made in two parts in the example illustrated) is wholly free. When lever 36 is lowered (Fig. 8) tooth 35 is disengaged from wheel 34, but pawl 38a is engaged therewith. Wheel 34 rotates against the action of the very light springs which act on pawl 38a until the tip of the latter abuts against lever 36. It will be readily understood that, owing to this mechanism of escapement, wheel 34 rotates through one tooth each time lever 36 is oscillated. This oscillation is effected against the action of a spring 39 (Fig. 6) by an electro-magnet 40, the movable armature 41 of which is pivoted at 42 and operates a rod 43 connected with an arm 44 forming an extension of lever 36. Adjustable abutments 44a and 44b limit the oscillation of arm 44.

There is disposed at the rear of die 8 (Fig. 14) a cylinder 45 formed with a number of equidistant circular grooves (Figs. 17 to 19). Feeler fingers 46 are disposed below cylinder 45, each finger corresponding to a groove. Fingers 46 are supported by levers 47 pivoted on a common shaft 48 and each lever 47 is provided with a spring 49 tending to raise the corresponding finger 46. The sheet 11 being passed under cylinder 45, a finger 46 will rise (Fig. 14) whenever there is a corresponding perforation provided through the sheet; at this position of finger 46 two blades 50 and 51, carried by the corresponding lever 47, are in electric contact with two insulated abutments 52 and 53. When the sheet moves in the direction of the arrow (Fig. 14) its plain portions lower finger 46 as indicated in broken lines and the electric circuits are opened. In Fig. 17 some fingers 46 are high while others are low; in Fig. 18 all the fingers 46 are low, the sheet being unperforated; in Fig. 19, fingers 46 are lowered by a cam 54 (Fig. 14).

Abutments 53 are connected with low voltage electric bulbs 55 (Fig. 20) disposed behind a glass plate 56 (Figs. 1, 20 and 13) bearing the indications of the different stops of the organ. The electric circuit of bulbs 55 is closed on one terminal of a transformer 56a the other terminal of which is connected with the metallic parts of the machine. Abutments 52 are connected with the usual electro-magnets 57 operating the stop sliders and their circuit is closed on an appropriate source of current 58 through the restoring springs 49, it being observed that contact blades 52 are insulated from levers 47 by insulating sleeves 59.

Figure 4:
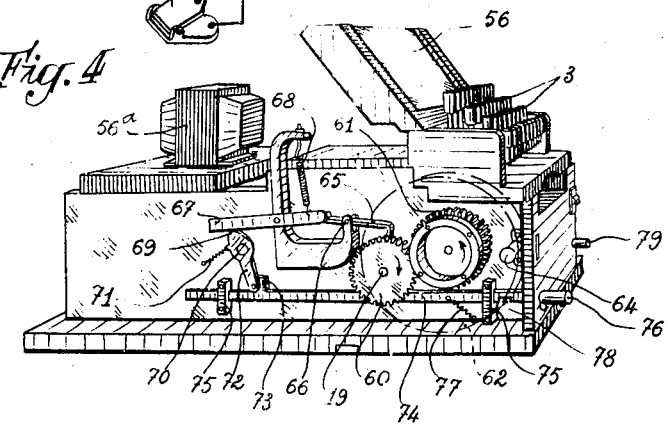
Fig. 4 is a side view opposed to Fig. 3, showing the locking device and the return mechanism.

The carriage driving shaft 19 also supports a gear wheel 60 (Fig. 4) in mesh with a wheel 61 carrying a transparent cylindrical dial 62 (Fig. 11) movable in front of a window 63 of casing 1 (Fig. 1), an electric lamp 64 being disposed inside the said dial. A ratchet pawl 65 permits rotation of wheel 60 in the direction indicated in Fig. 4, the said pawl, pivoted at 66, being connected with a lever 67. A spring 68 acting on lever 67 tends to press pawl 65 against wheel 60. A cam member 69 (Fig. 4), keyed on the shaft 70 of the above described cam 54 (see Figs. 14 and 15) may also act on lever 67 to disengage pawl 65 from wheel 60. A spring 71 acts on member 69 to bring the same out of action. Member 69 has a tail 72 which is acted upon by an abutment 73 provided on a slidable bar 74 guided at 75 and ending in a push-button 76. A spring 77 acts on bar 74 and there is provided on the latter a notch 78 by means of which it may be retained against the action of spring 77 by the nearest guide 75.

The mechanism just described normally prevents any back motion of the sheet. When button 76 is depressed, pawl 65 is disengaged and at the same time cam 54 is rotated whereby all fingers 46 are lowered. The sheet may thus be freely moved in any direction by means of handwheel 30.

The machine also comprises a button 79 (Fig. 3) controlling the circuit of electro-magnet 40; this button enables the organist to advance the sheet when required. The back face of casing 1 carries sockets 80 adapted to receive plugs for connection with the organ. Terminals 81 may be connected with a pedal switch 101 (Fig. 3) in parallel with button 79.

The operation is as follows:

The organist introduces a blank sheet into carriage 12. He then pushes button 76 and by means of handwheel 30 he returns carriage 12 backwards, if necessary.

The operator then depresses keys 3 in accordance with the first combination desired; the blank is thus perforated. He then pushes button 79 and the blank is advanced to receive the next row of perforations recording the second combination, and so on. It will be observed that the punches are rectangular in cross-section, their length being somewhat greater than the longitudinal distance between the successive rows of perforations in such a manner that when the same punch is operated in a number of successive combinations, it cuts a continuous elongated opening which avoids any interruption in the sound.

The operator is able to check the perforations whenever desired; he moves the sheet back (by handwheel 30) until the number of the combination to be checked is seen in front of window 63. By momentarily disengaging button 76, he causes cam 54 to rotate and to raise levers 47. Feeler fingers 46 are thus in operation and the combination may be read by means of electric bulbs 55. Plugs 80 may be disconnected, if desired, to avoid the organ stops being actuated, but this is not necessary since the actuation of the stops does not cause the organ to play if the organ keys proper are not depressed.

When the sheet is wholly perforated, the machine may be used in combination with the organ. The organist pushes the sheet backwards and then frees button 76. The organ stops are then automatically operated, the combinations being changed in their proper sequence by merely actuating each time button 79.

The machine is a separate unit from but wire connected to the organ; it forms at different times a sheet perforating machine and an automatic stop actuating device. It requires no modification to the organ proper.

I claim:

A machine for perforating a record sheet comprising in combination sheet carrying means adapted to be advanced step by step; sheet perforating punches rectangular in cross-section, the longitudinal dimension of said cross-section being greater than the step motion of said sheet; individual keys for operating said sheet perforating punches; electrical sheet feelers adapted to be actuated by the perforations of said sheet; and individual electric bulbs, each one of said bulbs being controlled by one of said electrical sheet feelers to visually indicate that a perforation has been sensed.

EDOUARD FRANCIS RUCHE.